United States Patent [19]

Pickett

[11] Patent Number: 4,624,609

[45] Date of Patent: Nov. 25, 1986

[54] APPARATUS FOR MILLING SIGN CUTOUTS AND LETTERS FROM TEMPLATES

[76] Inventor: David R. Pickett, 1613 S. 24th, Blue Springs, Mo. 64015

[21] Appl. No.: 708,238

[22] Filed: Mar. 5, 1985

[51] Int. Cl.$^4$ .............................................. B23C 1/16
[52] U.S. Cl. ....................................... 409/96; 29/720; 408/16; 409/97; 409/121; 409/124
[58] Field of Search .................... 409/84, 97, 103, 104, 409/110, 111, 112, 115, 121, 122, 123, 124, 96; 29/720; 408/16

[56] References Cited

U.S. PATENT DOCUMENTS

| | | | |
|---|---|---|---|
| 1,750,594 | 3/1930 | Henkes | 409/124 |
| 2,145,116 | 1/1939 | Howard | 409/96 X |
| 2,203,389 | 1/1940 | Kurtz | 409/96 X |
| 3,224,339 | 12/1965 | Nusbaum et al. | 409/115 X |
| 3,613,501 | 10/1971 | Sanders | 409/115 X |
| 4,102,246 | 7/1978 | Okamoto | 409/112 |

FOREIGN PATENT DOCUMENTS 662279  5/1979  U.S.S.R. ................................. 409/97

OTHER PUBLICATIONS

Brochure pages entitled Inverted Router, Model 2003 by Cr. R. Onsrud, Inc.

*Primary Examiner*—Gil Weidenfeld
*Assistant Examiner*—Glenn L. Webb
*Attorney, Agent, or Firm*—Schmidt, Johnson, Hovey & Williams

[57] ABSTRACT

A router is coupled to a pair of pivotally connected arms for free swinging movement about a horizontal plane in a space between a template and a workpiece. The router has an upwardly extending guide pin that is engageable with the template and a downwardly extending cutting bit which is concentric to the guide pin and engageable with the workpiece below. The template is in parallel, opposed relationship to the workpiece such that as the guide pin is moved about the template, the cutting bit simultaneously mills the workpiece to produce the sign. In preferred forms, a mirror carried by the router reflects an image of the guide pin to the machine operator during engagement with the template, and the mirror is also located in disposition relative to the operator's line of sight toward the cutting bit such that both the bit and the guide pin may be simultaneously observed.

10 Claims, 10 Drawing Figures

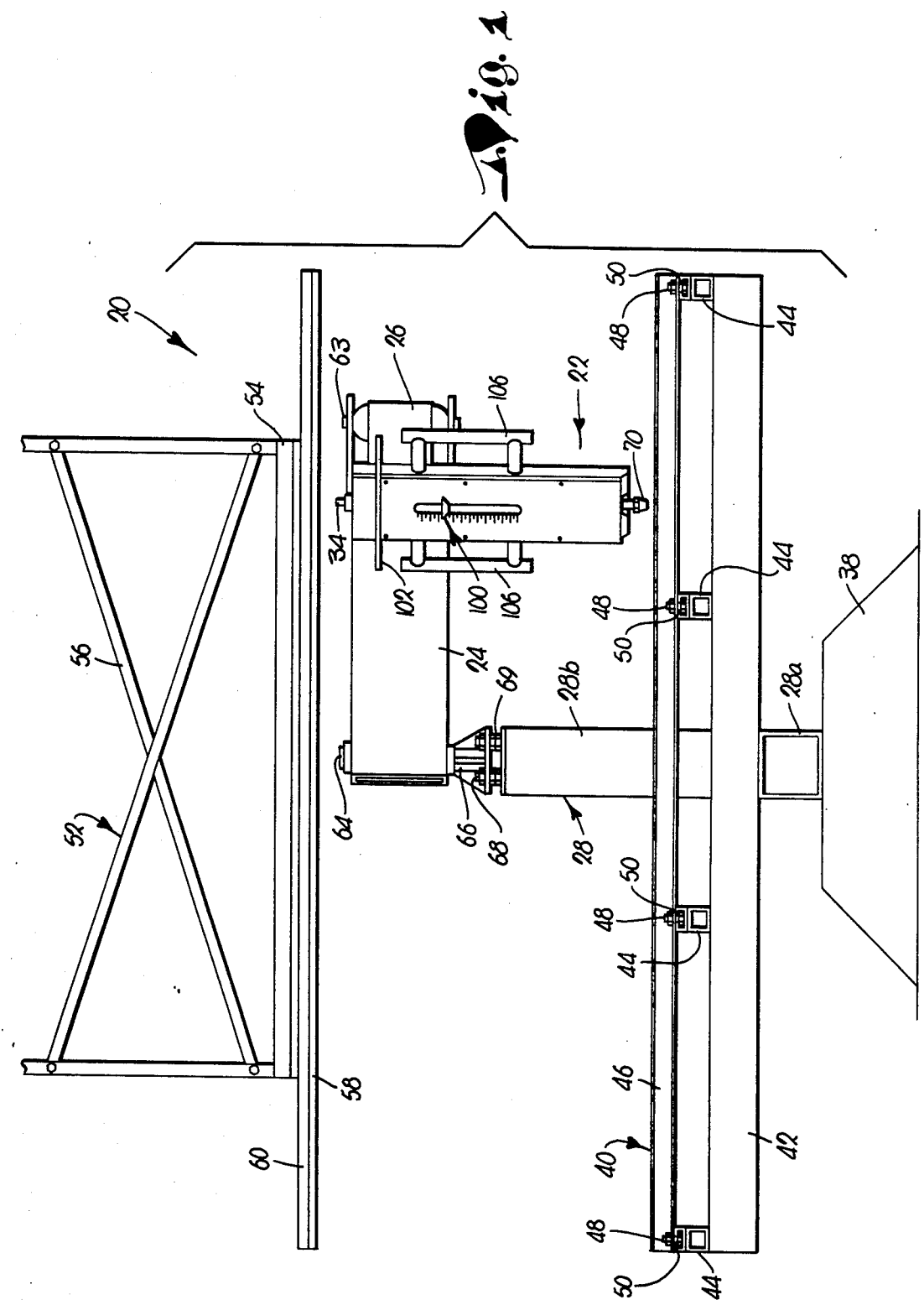

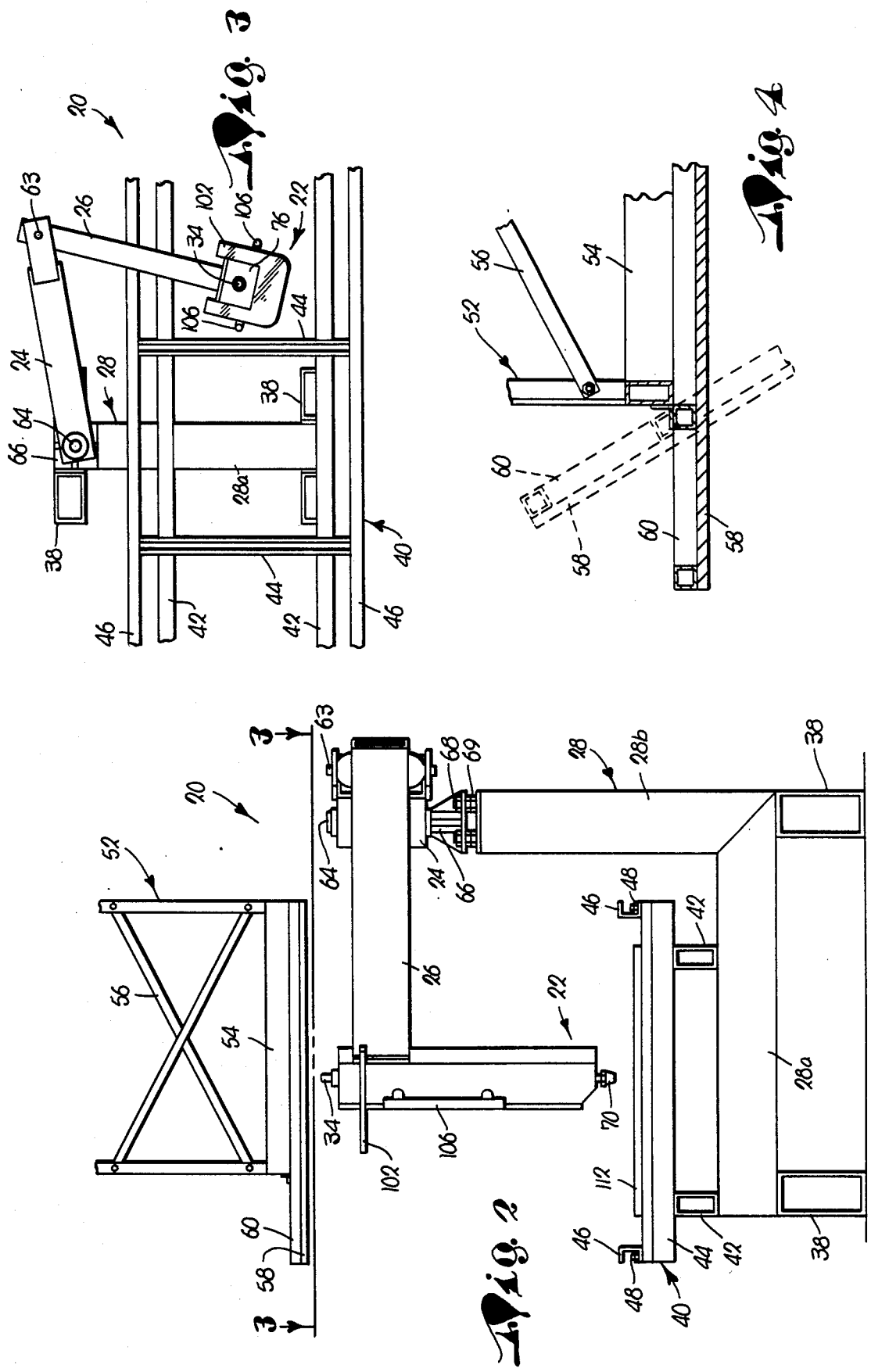

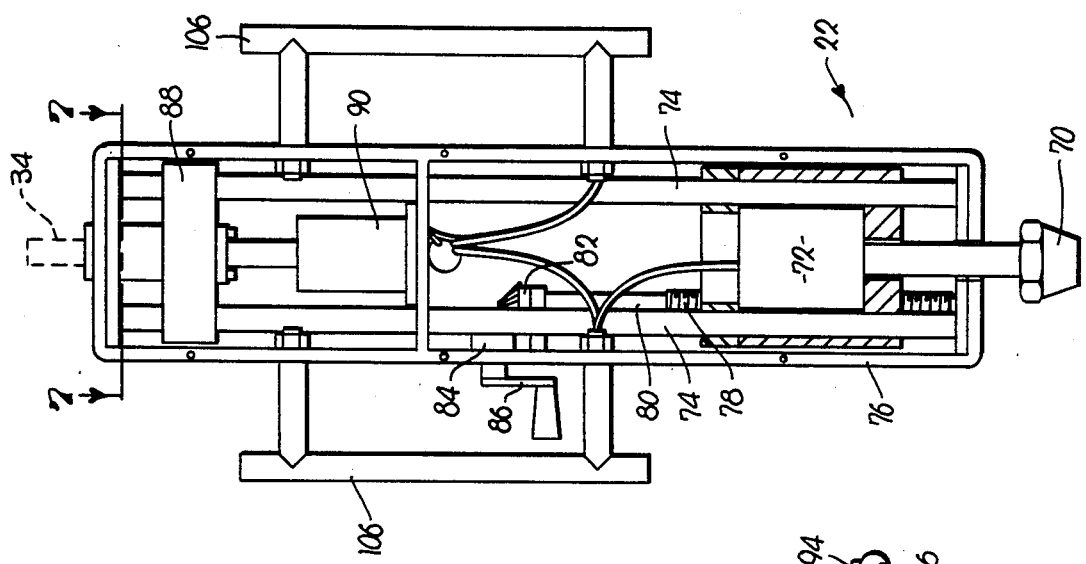
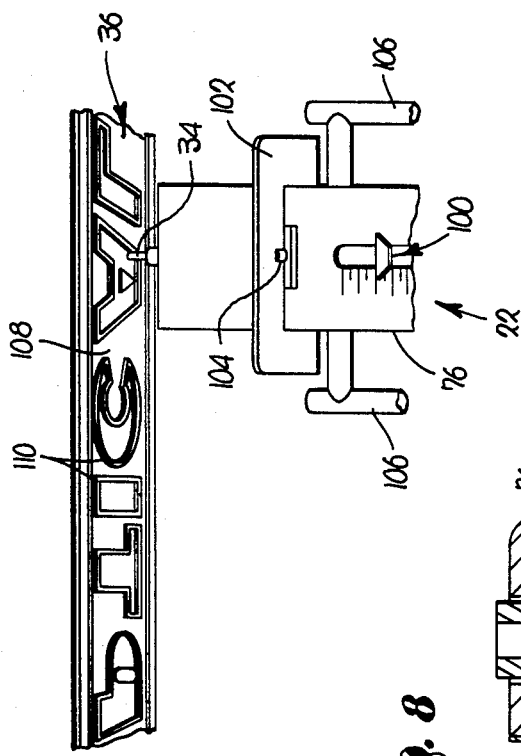
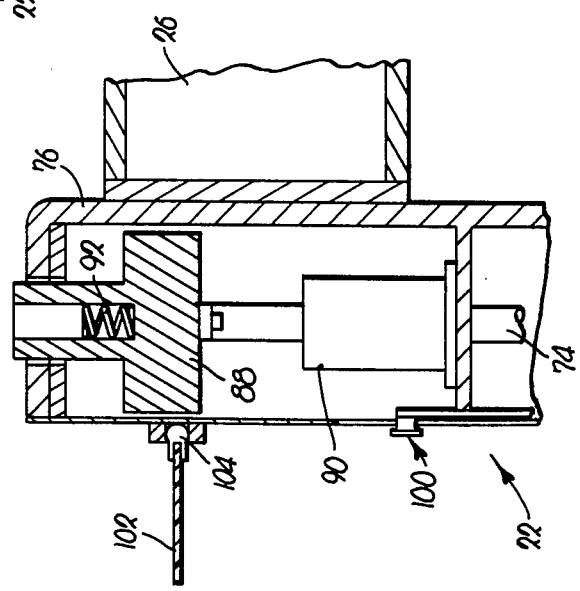

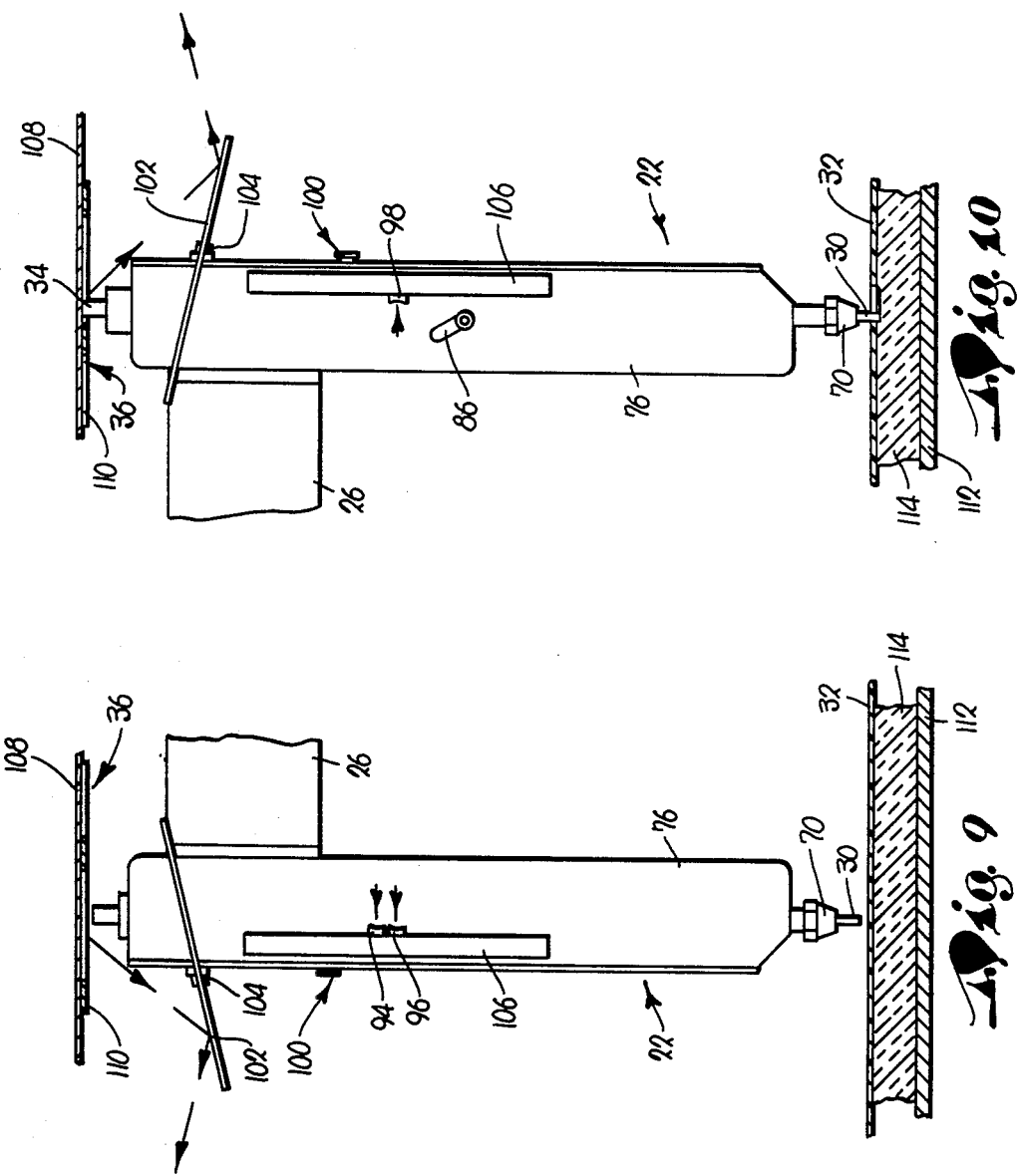

APPARATUS FOR MILLING SIGN CUTOUTS AND LETTERS FROM TEMPLATES

BACKGROUND OF THE INVENTION

1. Field of the Invention

The present invention relates to a routing machine which is especially useful for facilitating fabrication of commercial signs of the type having letters or logo symbols cut out of or into a sheet of material such as metal, or in the alternative for cutting the letters or symbols themselves as separate entities for attachment to a support. The machine has a controllable arm which is shiftable in a manner to move a cutting bit along a path determined by a directly related template-engageable guide pin associated with the bit.

2. Description of the Prior Art

Signs having raised or recessed three-dimensional letters, or of a nature where the letters or symbols are flush mounted but of a different material than the main body of a sign are both readily perceptible and aesthetically pleasing. Such signs are typically manufactured from wood, wood products, plastic, or metal such as aluminum and, like their flat, painted counterparts, are usually produced on an individual, custom made basis. Unfortunately, the milling or routing machines commonly used to date to cut the letters either out of a sheet which is then backed up with a translucent panel or individual letters from flat stock, are not only inefficient but also present certain hazards to the worker's hands.

Best results are obtained when free-hand cutting is avoided and the router caused to follow a template which guides movement of the cutting bit. Signs or letters and symbols have in the past been milled by an inverted table router which has an overhead, downwardly directed, cylindrical guide pin coaxial with and spaced at a slight distance from an opposed, upwardly extending, coaxially aligned cutting bit. The template is secured to the upper surface of the workpiece, and as the periphery of the template is moved along the stationary guide pin, the underlying bit simultaneously cuts the workpiece.

Use of an inverted table router, however, is generally unsatisfactory for cutting multiple letters or symbols from a large sheet of material, as each template must be fastened with nails or glue to the workpiece itself, a disadvantage in many instances and inconvenient at best. Also, wood chips or other debris thrown from the cutting bit may wedge temporarily between the adjacent guide pin and the template whereupon the router is subsequently thrown off course. Also, it is possible for the cutting bit to accidentally gouge the proximal template such that a new template must then be painstakingly fashioned.

Operators using inverted table routers also suffer a noteworthy disadvantage from the lack of ability to see the quality of the cut, such that once the operation is completed, the template and workpiece must be removed from the support table and turned over to inspect the smoothness of the finished edge. It is also important to note that if the router bit was instead disposed over the table and the guide pin was mounted to extend upwardly from the table toward the bit, then although the finished edge could be seen the user's vision of the template would be obstructed, for the most part, by the workpiece itself, such that the user would be unaware of deviations of the template edge from the guide pin. Consequently, whenever the template and workpiece are sandwiched together, the vision of one or the other during the cutting operation must, by necessity, be substantially blocked.

Another method of milling sign cutouts or letters and symbols which has been proposed in the past is the use of a router mounted on a device similar to a pantograph. However, the multiplicity of arms and joints are subject to binding and considerable free play such that a less than desirable finished result is usually obtained.

Microprocessor controlled routers have recently been introduced into the market but they are prohibitively expensive and are difficult if not impossible to pre-program for all types of symbols and letters to be formed, noting in this respect that many if not all signs have individual art work letters, but even if somewhat standardized in form, are necessarily of different sizes from sign to sign.

SUMMARY OF THE INVENTION

The present invention advances sign making technology to a state heretofore unknown in the art. The milling apparatus as disclosed herein is safe and easy to use, yet can produce with great precision a sign cutout or letter or symbol of practically any complex shape.

More specifically, the milling apparatus incorporates a router that in a preferred form is coupled to a pair of swingable, pivotally interconnected arms which swing about vertical axes. The router has a vertical cutting bit which extends downwardly and also is provided with a vertically oriented, upwardly extending guide pin that is concentric with the cutting bit. The apparatus includes a support for securing a flat workpiece in a horizontal, face-up orientation, and also includes structure for mounting a reversed image template in opposed, face-down, parallel orientation above the workpiece.

The router is mounted on the arms for swinging movement horizontally in the space between the template and the workpiece. In use, the router is moved such that the guide pin follows the edge of the lettering on the template, whereupon the cutting bit concurrently mills an identical, albeit reversed, pattern in the workpiece. A mirror fixedly mounted on the router housing is disposed so that the operator may watch the movement of the guide pin against the template while also observing the cutting action of the bit to insure an accurate reproduction of the template.

As a result, the milling apparatus of the instant invention offers considerable advantages in ordinary use over prior art devices. For instance, where identical signs are to be repetitiously produced from a single template, the latter need not be carefully secured to a workpiece, in contrast to inverted table routers. Furthermore, because the router motor is above the workpiece, wood chips, dust and other damaging debris will not fall into the motor bearings and windings. Finally, rapid and error free reproductions of virtually any art work templates may be accomplished.

BRIEF DESCRIPTION OF THE DRAWINGS

FIG. 1 is a front elevational view of the milling apparatus showing the workpiece support, the template mounting structure and a preferred embodiment of the swingable router;

FIG. 2 is an side elevational view of the apparatus shown in FIG. 1;

FIG. 3 is a fragmentary, plan view taken along a horizontal line perpendicular to line 3—3 of FIG. 2, showing the router, the swingable, pivotally interconnected arms and the workpiece support;

FIG. 4 is an enlarged, fragmentary, side sectional view of a portion of the template mounting structure wherein the dashed lines show the pivotal movement of the platform about the overhead frame;

FIG. 5 is a fragmentary, enlarged, front elevational view illustrating the cooperative engagement of the template with the guide pin of the router;

FIG. 6 is an enlarged, front sectional view of the router with the cutting bit and guide pin removed;

FIG. 7 is a horizontal sectional view taken along line 7—7 of FIG. 6;

FIG. 8 is a fragmentary, enlarged side sectional view of the router, mirror and one of the swingable arms;

FIG. 9 is an enlarged, fragmentary, elevational view of one side of the router placed in preparation for use between the template and the workpiece, additionally depicting the orientation of the mirror for visual observation of the template; and FIG. 10 is a view similar to FIG. 9 showing the opposite side of the router and illustrating the operation of the cutting bit while the guide pin follows the template.

DETAILED DESCRIPTION OF THE PREFERRED EMBODIMENT

An apparatus for milling sign cutouts and letters using templates as a guide is broadly designated by the numeral 20 and is best illustrated in FIG. 1. In general, the apparatus 20 comprises a router 22 that is swingably supported for movement in a horizontal direction by virtue of the provision of a pair of mounting arms 24, 26 carried by frame 28. As seen in FIGS. 9-10, the router 22 has a downwardly extending, replaceable cutting bit 30 that is operable to mill a workpiece 32 while an upwardly extending guide pin 34 is located to complementally follow a path of travel defined by a template 36 which directs movement of the router 22.

In more detail, the frame 28 as shown in FIG. 2 is L-shaped and includes a lower horizontal leg 28a and an upright leg 28b. The leg 28a is secured to a pair of spaced, transverse base members 38. A workpiece carrying support broadly designated 40 is coupled to the frame 28, and the support 40 includes a pair of spaced, horizontal beams 42 which are connected to a series of elongated spaced, fore and aft channels 44. A pair of outwardly opening, front and rear, elongated transversely U-shaped rests 46 are coupled by bolts 48 extending through respective slots 50 within the channel 44. Upon loosening of corresponding bolts 48, each of the rests 46 may be shifted toward and away from one another in directions parallel to the longitudinal axes of the channels 44.

Structure broadly numerated 52 is located above the support 40 for mounting a selected generally flat template 36. As best seen in FIGS. 1 and 2, the structure 52 includes a four-legged scaffold 54 which is interconnected by bracing 56. Additionally, the structure 52 includes a platform 58 that is secured to a rectangular framework 60. Viewing FIG. 4, it can be seen that a pivot 62 interconnects the framework 60 and the scaffold 54 for swinging movement of the platform 58 about a horizontal axis parallel to the workpiece rests 46.

The arms 24, 26 provide a means for coupling the router 22 to the upright leg 28a of frame 28 for movement in any one of a number of horizontal directions. As best shown in FIG. 3, the router 22 is fixedly secured to one end of the arm 26 and a pivot 63 remote from the router 22 interconnects the arm 26 to the arm 24. Additionally, an upright post 64 extending upwardly from leg 28b remote from the pivot 62 rotatably carries the arm 24 for swinging movement in a horizontal plane. As shown in FIGS. 1-2, the post 64 is secured to a flange 66, which in turn, is mounted on the leg 28b of frame 28 by four bolts 68. Adjusting nuts 69 threadably engage each of the bolts 68 for vertical adjustment of the orientation of the arms 24, 26 relative to the frame 28.

As best shown in FIG. 6, the router 22 includes a chuck 70 that is operable to selectively secure an elongated cutting bit 30 in vertical orientation. A motor 72 provides a means for selectively rotating the bit 30 when the latter is held in operative disposition by the chuck 70.

Referring to FIGS. 6-7, the router 22 also includes a pair of elongated, spaced, vertical guide shafts 74 which are carried by a housing 76. In turn, the motor 72 slidingly engages the shafts 74 to permit movement of the chuck 70 and the cutting bit 30 along a line concentric with the longitudinal axis of the latter. The housing of motor 72 is provided with an internally threaded collar secured thereto which in turn threadably engages the external threaded section 78 of a rod 80 projected from the upper end of the housing. A bevel gear 82 is mounted on the upper end of the rod 80 for rotation about the axes of the rod. Also, the bevel gear 82 meshingly engages a second bevel gear 84 which is coupled to a crank 86 rotatably carried by the housing 76. Thus, the crank 86, the gears 82, 84 and the threaded section 78 of rod 80 provide a means for locating the cutting bit 30 in any one of a number of vertical positions along its longitudinal axis.

The router 22 also includes an elongated, cylindrical guide or guide pin 34 which is supported to the housing 76 by means of an internal block 88 that is slidable on the guide shafts 74. As seen in FIG. 6, means such as a solenoid 90 or equivalent mechanism may be employed to selectively shift the guide pin 30 along a line concentric to its longitudinal axis. As shown in FIG. 8 with the pin 34 removed, the block 88 carries a spring 92 which is operable to bias the pin 34 against the template 36.

Referring to FIG. 9, it can be seen that the housing 76 carries a switch 94 for activation of the solenoid 90 to extend the guide pin 34 in an upward direction while the switch is held in, and a switch 96 is operably coupled to the solenoid 90 to move the pin 94 in a downward direction, again while such switch is maintained in an activated condition. As illustrated in FIG. 10, the housing 76 also supports an on/off switch 98 for selective activation of the motor 72. Additionally, as shown in FIGS. 1 and 5, a depth gauge 100 provides a visual indication of the position of the bit 30 relative to the lower end of the housing 76.

Referring to FIG. 8, a mirror 102 is supported by the router 22 and is swingable by means of a pivot 104 about a horizontal axis. Finally, a pair of handles 106 for facilitating manual manipulation of the router are fixedly secured to opposite sides of the housing 76.

The template 36, as shown in FIG. 5, may be constructed in any one of a number of conventional ways used in the sign industry. For example, such template may be fabricated by fixing a layer of sheet material (not shown) to a flat backing board 108. Preferably, the sheet material is of a synthetic resin composition such as vinyl, one side of which has a self-sticking adhesive outer layer to facilitate affixation of the template to a support board. If it is assumed that a sign is to be prepared having cutout letters or a logo cutout in a sheet material base, the periphery of a desired shape of a cutout is then cut in a reverse image configuration on the sheet material by a small knife or other suitable tool. Next, a second cut is made in the sheet material such that a portion of the latter around the peripheral cut external to the desired final shape can then be removed from the backing board 108.

A quantity of material, such as a self-curing synthetic resin epoxy 110, may then be poured onto the backing board 108 within the area previously occupied by the removed portion of the sheet material. The epoxy 110 is allowed to cured until it hardens, whereupon the remaining portion of the flexible sheet material may then be removed from the backing board 108 such that only the epoxy 110 in the reversed image configuration of the final cutout remains on the backing board 108. The rigid epoxy comprises a reverse, direct image of the letters or logo to be cut out of the sign base plate.

OPERATION

In use, the backing board 108 of the template 36 is swung upwardly from its normal, horizontal position, allowing the template or templates to readily be secured to the board 108 and to assure proper disposition of the template on the board. Care should be taken during mounting of the template(s) and the sheet to be cut to provide proper registration therebetween. The flat workpiece 32 may be secured to the support 40 by appropriate means such as a pair of clamps (not shown). Preferably, a sheet of plywood 112, as illustrated in FIGS. 9-10, is placed upon the channels 44 and a layer of styrofoam 114 or similar material is placed over the plywood 112 in supporting relationship to the sheet 32 (which for example may be a piece of aluminum that has previously be treated to provide a requirement surface or ornamentation. The bolts 48 are loosened and the rests 46 are adjustably shifted so that the upper edges of the latter are engageable with outer opposed edges of the workpiece 32. Thus, while workpiece 32 is secured to the rest 46, the styrofoam 114 supports the inner extent of the workpiece 32 to be cut and also dampens vibrations which may occur as a result of the milling operation.

Next, the solenoid 90 is activated to move the guide pin 34 upwardly into engagement with a guide edge of the epoxy resin template 36. The motor 72 is next actuated to cause the bit 30 to rotate at a relatively high speed, whereupon the crank 86 is turned to lower the bit 30 into cutting engagement with the workpiece 32. At this point, it is but a simple operation to mill the workpiece 32 into a shape of a cutout conforming to the configuration of the template 36, since the arms 24, 26 freely swing to allow multi-directional movement of the router 22 as the user moves the guide pin 34 around the edges of the pattern of the epoxy 110.

As should now be obvious to one skilled in the art, the structure 52 is operable to mount the template 36 in horizontal, parallel, face-down orientation to the workpiece 32 as the latter is engaged with the support 40. Additionally, the pivot 63 as well as the post 64 render the router 22 movable in a horizontal plane parallel to the workpiece 32. Normally, the platform 58 is clasped in horizontal orientation against the scaffold 54; however, as previously alluded to, the platform 58 may be selectively moved about the pivot 62, as shown by the dashed lines in FIG. 4, to facilitate mounting or removal of the template(s) 36.

The final cutout milled by the apparatus 20 precisely matches the template 36 by virtue of the fact that the cutting bit 30 and the concentric guide pin 34 are carried on a common housing 76. In contrast, table routers utilize interconnected C-shaped framework to support the guide pin in proximal disposition to the cutting bit, and such framework often necessitates adjustment and alignment after extended periods of use.

Apparatus 20 of the present invention is also highly suitable for use when engraving, as the router 22 is freely swingable on the floating, pivotal arms 24, 26. The crank 86, in conjunction with the gauge 100, provide excellent depth control. Noteworthy also is the fact that the apparatus 20 may be used in freehand style, during engraving or routing, merely by retracting the guide pin 34.

The mirror 102 is conveniently disposed to reflect an image of the guide pin 34 as the latter engagingly follows the template 36. As shown by the arrows in FIGS. 9-10, the mirror 102 is adjacent the operator's normal line of sight when standing in front of the apparatus 20 and observing the cutting bit 30. The opposed nature of the cutting bit 30 to the guide pin 34, in cooperation with the mirror 102, allows the user to simultaneously observe both the bit 30 and the pin 34, in stark contrast to prior art table routers.

Furthermore, because the router 22 is moved instead of the workpiece 32, the latter may be quite heavy or bulky without effecting the tolerance of the cut. Also, because the workpiece 32 does not slide about a table, the occurance of scratches or rubbing marks on the finished surface of the sign is virtually eliminated.

The essential nature of the apparatus 20 provides numerous safety features not found in prior art table routers. During use, the hands of the operator normally grasp the handles 106, such that accidental engagement with the cutting bit 30 is, for the most part, precluded. By contrast, prior art table routers having a stationary cutting bit require that the user force the workpiece into the bit, and, accordingly, slippage or other accidental movements could constitute a serious hazard. Furthermore, if the workpiece is fed toward the bit of a prior art router in the wrong direction, the bit often would bite into the workpiece and propel the latter from the machine at a great velocity, thus seriously endangering the safety of the user or nearby observers. However, the workpiece 32 when milled by the instant invention is securely clamped to the rest 46 such that the likelihood of injury is greatly diminished.

Various sized letters may be constructed from the same template merely by changing the diameter of the guide pin 34 or, alternatively, the diameter of the cutting bit 30. Additionally, the cylindrical bit 30 as shown in FIGS. 9-10 may be replaced by a cove, chamfered or beveled bit to produce any number of desired configurations. Provision of a template defining grooves presenting letters or the like may be used to guide the bit 30 to cut solid letters rather than cutouts.

Finally, spaced parallel bars in turn supporting two or more parallel bars spanning the first pair and movable along the length of the support bars may be used as equivalent supports for the router assembly. Ball bearings mounting the floating bars on the support bars provide for relatively frictionless movement of the router in a horizontal plane.

I claim:

1. Apparatus for milling sign cutouts and letters from templates comprising:

a frame;

a housing shiftably carried by the frame for movement in any direction along paths of travel which lie in a common plane;

an elongated, workpiece-engageable cutting bit rotatably carried by said housing;

means for rotating said bit;

an elongated guide coupled to said housing and adapted to engage the edge surfaces of a template, said guide and the bit being disposed to project outwardly from said housing in generally opposite directions in perpendicular relationship to the plane in which said housing is movable;

a workpiece support located in a position to carry a workpiece in parallel relationship to said plane in which the housing is movable and in disposition for selective engagement of the bit with the workpiece;

a template support in a position to carry a template in generally parallel relationship to said plane and located such that the guide may be disposed to ride along said edge surfaces of the template; and a mirror between said supports, movable with the housing and having a reflective surface facing toward a template on the template support when the latter is in said position thereof, said mirror being located in disposition such that during use of the bit to produce a reproduction of the template in the workpiece, the operator may visually observe the reflected image of the guide in engagement with the edge surfaces of the template and also see the bit in contact with the workpiece without significant movement of the operator's head being required.

2. Apparatus as set forth in claim 1, wherein said mirror is located at a slight angle with respect to said plane and thereby the supports.

3. Apparatus as set forth in claim 1, the longitudinal axis of said guide and the longitudinal axis of said cutting bit being concentric.

4. Apparatus as set forth in claim 1, wherein is provided means for selectively shifting the guide toward and away from the bit.

5. Apparatus as set forth in claim 1, wherein is provided means for releasably securing said cutting bit in any one of a number of positions in a direction parallel to its longitudinal axis.

6. Apparatus as set forth in claim 1, wherein said workpiece and said template are generally flat and parallel to said plane during milling of the workpiece while the guide is in selective engagement with the template.

7. Apparatus as set forth in claim 1, wherein is provided means on said housing for manual grasping thereof facilitating movement of the housing in said plane by the operator as the guide is caused to follow a path defined by the edges of the template and the bit is in cutting engagement with the workpiece.

8. Apparatus as set forth in claim 1, wherein said mirror is carried by the housing between the guide and said bit.

9. Apparatus as set forth in claim 1, wherein said housing is carried by the frame for movement in a generally horizontal plane.

10. Apparatus as set forth in claim 8, wherein said housing is disposed in a location such that the operator may look down on a workpiece carried by the support therefor and the mirror and template support are strategically positioned such that the operator may look down onto the reflective surface of the mirror and observe the reflected image of the guide in engagement with a template carried by the overhead template support, while still observing the bit in cutting engagement with the workpiece on the workpiece support.

* * * * *